United States Patent
Fish

(12) United States Patent (10) Patent No.: US 7,240,607 B2
Fish (45) Date of Patent: Jul. 10, 2007

(54) REMOVABLE END PLUG

(75) Inventor: Elson B. Fish, Lakeville, IN (US)

(73) Assignee: Polygon Company, Walkerton, IN (US)

( * ) Notice: Subject to any disclaimer, the term of this patent is extended or adjusted under 35 U.S.C. 154(b) by 8 days.

(21) Appl. No.: 11/210,224

(22) Filed: Aug. 23, 2005

(65) Prior Publication Data

US 2007/0044655 A1    Mar. 1, 2007

(51) Int. Cl.
 *F16J 10/00* (2006.01)
(52) U.S. Cl. ............... 92/169.1; 92/128; 92/170.1
(58) Field of Classification Search .......... 92/169.1, 92/128, 170.1
See application file for complete search history.

(56) References Cited

U.S. PATENT DOCUMENTS

| | | | | |
|---|---|---|---|---|
| 2,451,089 A | * | 10/1948 | Hunter | 92/168 |
| 3,811,367 A | * | 5/1974 | Bimba | 92/165 R |
| 3,921,505 A | * | 11/1975 | Wunsch | 92/169.1 |
| 4,207,802 A | | 6/1980 | Homuth | 91/405 |
| 4,211,150 A | | 7/1980 | Framberg | 92/119 |
| 4,233,887 A | * | 11/1980 | Stoll | 92/169.1 |
| 4,384,511 A | * | 5/1983 | Mefferd | 92/169.1 |
| 4,386,552 A | | 6/1983 | Foxwell | 91/1 |
| 4,552,055 A | | 11/1985 | Foxwell | 92/5 |
| 4,922,805 A | * | 5/1990 | Beswick | 92/166 |
| 4,930,204 A | * | 6/1990 | Schurter | 29/419.2 |
| 4,932,313 A | | 6/1990 | Gutknecht | 92/181 |
| 5,669,284 A | * | 9/1997 | Fish | 92/128 |
| 6,073,441 A | | 6/2000 | Harju | 60/414 |
| 6,615,703 B2 | | 9/2003 | Kendall | 91/44 |
| 2003/0135995 A1 | | 7/2003 | Glasson | 29/832 |

* cited by examiner

*Primary Examiner*—Igor Kershteyn
(74) *Attorney, Agent, or Firm*—Barnes & Thornburg LLP; Mark J. Nahnsen

(57) ABSTRACT

A pressure assembly including a cylinder, an end plug and a split ring band. The cylinder has an end, an inner surface and an outer surface. The end plug is inserted into the end of the cylinder, the end plug having an outer surface that is in partial contact with the inner surface of the cylinder. The split ring band is in contact with the outer surface of the cylinder, the split ring band being secured to the cylinder and to the end plug.

17 Claims, 3 Drawing Sheets

REMOVABLE END PLUG

BACKGROUND OF THE INVENTION

1. Field of the Invention

The present invention relates to a hydraulic/pneumatic cylinder, and, more particularly, to a hydraulic/pneumatic reinforced polymeric composite cylinder with a removable end plug.

2. Description of the Related Art

Hydraulic and pneumatic cylinders are utilized for converting pressurized fluid into mechanical movement in a controlled manner. Hydraulics allow for the amplification of mechanical force by translating a pressure applied against a surface to force a piston to move inside of the cylinder, the piston being connected to a shaft that extends beyond the cylinder to thereby move a connected assembly. Air cylinders are often used in environments where hydraulic fluids would be undesirable, such as in food processing facilities.

In a typical hydraulic/pneumatic cylinder, one end of the cylinder is enclosed with a plug and an opposite end is enclosed with a plug having a hole therein for accommodating a shaft that moves therethrough. Periodically cylinders are rebuilt by disassembling the cylinder and replacing worn parts.

The most common and simplest form of attaching ends to a cylinder is by way of tie rods that extend from one end of a cylinder to the other. In this configuration a composite cylinder tube can normally be interchanged with an existing metallic cylinder made of aluminum, stainless steel or carbon steel. However, in cases where tie rod designs are not desirable or permissible it becomes difficult to attach removable ends.

Additional ways of connecting removable ends to metallic cylinders include, machining threads on to the end caps and the cylinder bores, thereby providing a way to remove and install an end cap by screwing the parts together. Machining an annular groove in the bore of the cylinder and using a retaining ring to hold the end cap in place. Also, the end cap can be held in place by way of radially positioned screws located around the circumference of the cylinder that thread into the end cap.

Problems associated with these methods relative to reinforced polymeric composite cylinders include: Cutting threads into a filament wound composite severs the reinforcing members of the composite thereby substantially reducing the shear strength at the thread location. For example, the reinforcing members such as fiberglass can contribute an order of magnitude over the strength of the matrix in a composite. If these continuous members are cut, the strength of the composite is greatly reduced. Upon repeated assembly the threads tend to break down easily due to low shear strength of the threads. The conventional design for the use of retaining rings in a composite is not desirable due to the eroding of the groove in the composite cylinder tube by the metallic retaining ring under cycling conditions. It has been found upon repeated cycling the retainer ring will erode the groove in such a manner that a ramp is formed allowing the ring to work its way out of the groove and thereby releasing the end caps. Bolting or pinning the end attachment by radial orientated fasteners around the circumference of the tube is not desirable due to the cutting of reinforcement through the entire thickness of the laminate at the holes, stress concentrations at the hole locations and potential micro-cracking in the laminate at the hole locations which could result in crack propagation under stress cycling conditions.

What is needed in the art is a pneumatic/hydraulic cylinder that allows simple assembly techniques and is easy to disassemble for maintenance purposes.

SUMMARY OF THE INVENTION

The present invention provides a removable end plug assembly for a hydraulic/pneumatic cylinder.

The invention comprises, in one form thereof, a pressure assembly including a cylinder, an end plug and a split ring band. The cylinder has an end, an inner surface and an outer surface. The end plug is inserted into the end of the cylinder, the end plug having an outer surface that is in partial contact with the inner surface of the cylinder. The split ring band is in contact with the outer surface of the cylinder, the split ring band being secured to the cylinder and to the end plug.

An advantage of the present invention is that the cylinder can be easily disassembled utilizing common tools.

Another advantage of the present invention is that a common tube, such as a reinforced synthetic tube may be utilized.

Yet another advantage of the present invention is that the end plug is secured by an exterior split band that is associated with a groove on the outside surface of the cylinder.

Still yet another advantage of the present invention is that the clamping ring helps distributes the stresses into the composite, thereby reducing concentrated shear stresses.

Still yet another advantage of the present invention is that the clamping ring also applies radial compression pressure to the composite tube. This compression pressure tends to load the reinforcing fibers throughout the wall thickness of the composite more uniformly thereby reducing low stress fiber breakage.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
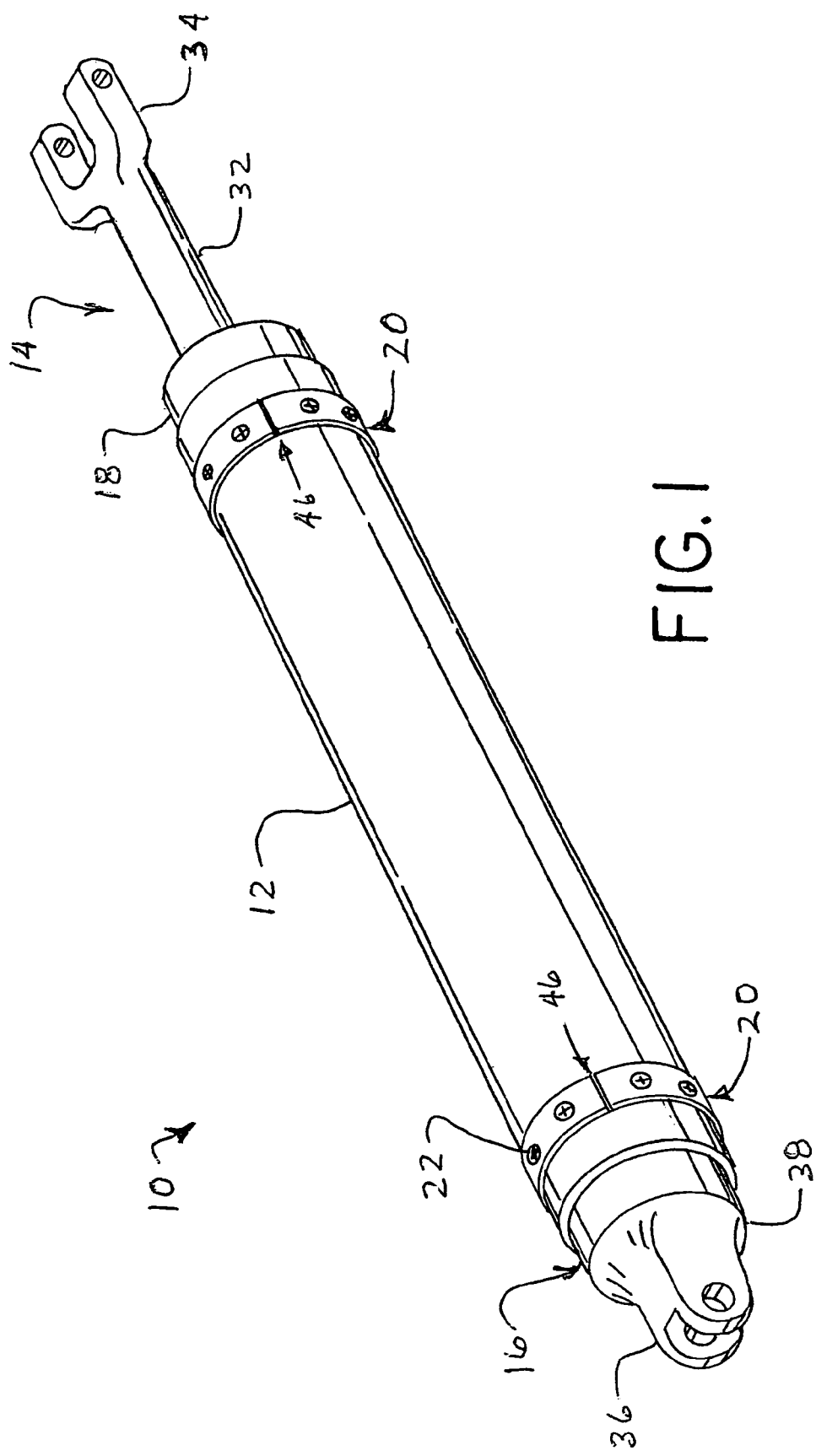
FIG. 1 is a perspective view of an embodiment of a pressurized cylinder having a removable end plug of the present invention.
Figure 2:
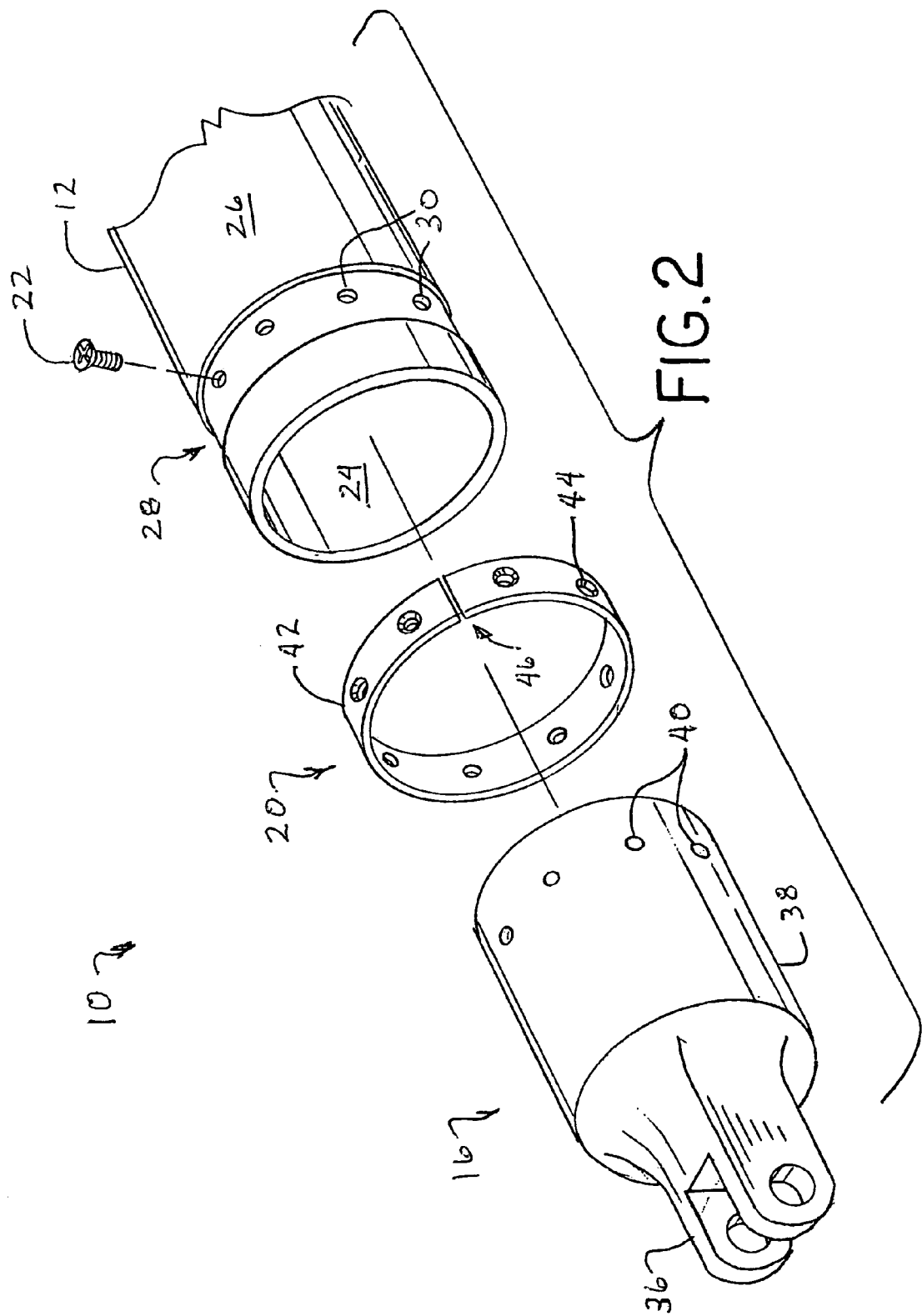
FIG. 2 is an exploded perspective view of the end plug assembly of FIG. 1.
Figure 3:
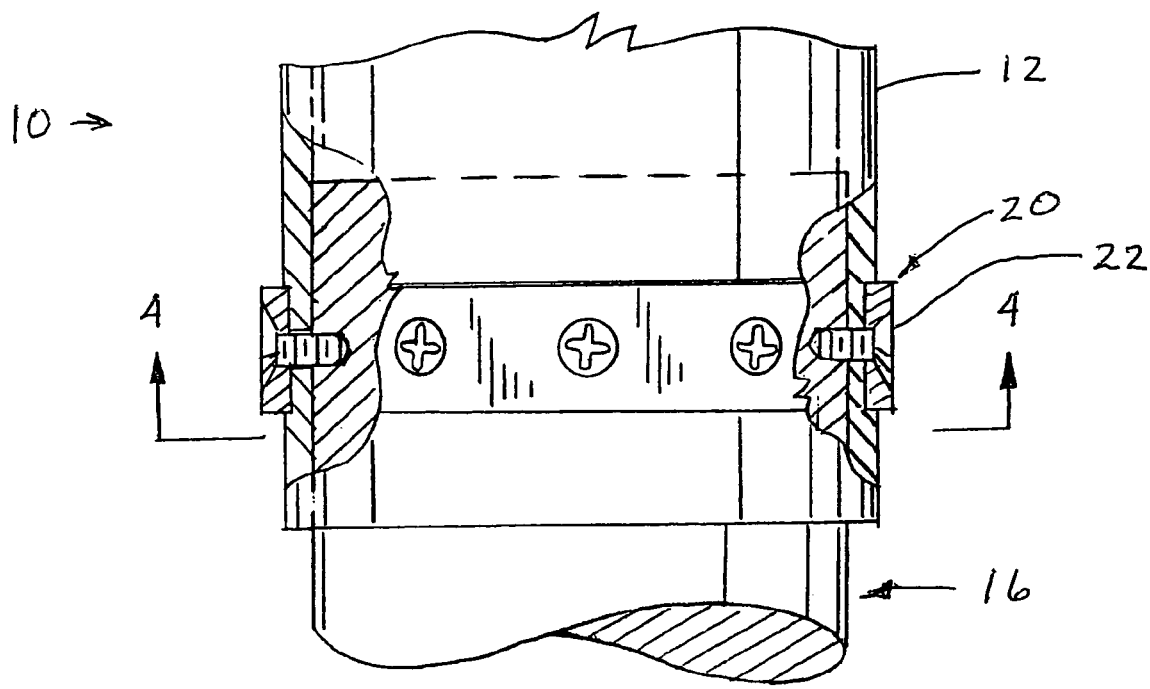
FIG. 3 is a partially sectioned side view of the end plug assembly of FIGS. 1 and 2.
Figure 4:
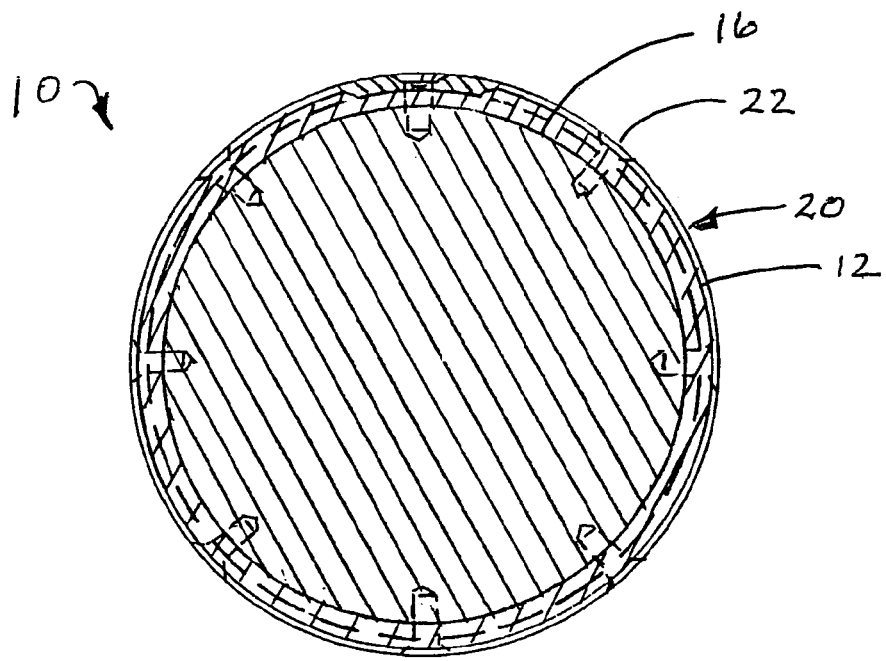
FIG. 4 is a sectional view of the end plug assembly taken along section line 4—4 of FIG. 3.

Referring now to the drawings, there is shown an embodiment of an end plug hydraulic/pneumatic assembly 10 of the present invention including a synthetic cylinder 12, a piston assembly 14, end plugs 16 and 18, split ring bands 20 and fasteners 22. End plugs 16 and 18 are inserted into cylinder 12 and are secured thereby by interaction of fasteners 22 going through openings in split ring bands 20 through cylinder 12 and into end plugs 16 and 18.

In the embodiment shown, synthetic cylinder 12 is in the form of a composite cylinder or tube made of a fiberglass matrix embedded within a resin, also known as a reinforced polymeric composite cylinder 12. Reinforced polymeric composite cylinder 12 may be a glass reinforced filament wound thermoset composite tube 12. Reinforced polymeric composite cylinder 12 includes an inner surface 24, an outer surface 26, annular grooves 28 and holes 30. Inner surface 24 is substantially smooth and cylindrical in nature, even though inner surface 24 may be of any shaped configuration, for ease of illustration a cylindrical system has been described and pictured. Piston assembly 14 includes a piston (not shown) that traverses most of the length of reinforced polymeric composite cylinder 12 in a sealed manner containing fluid on at least one side thereof. The fluid utilized may be a non-compressible fluid, such as oil, or a compressible fluid such as air. Outer surface 26 is illustrated as being cylindrical, although alternate shapes can be utilized as well. Annular grooves 28 are positioned towards each end of reinforced polymeric composite cylinder 12 so as to accommodate the placing of a split ring band 20 therein. Annular groove 28 is of a cylindrical nature of a reduced diameter from outer surface 26 and is shaped to accommodate the positioning of split ring band 20 therein. Holes 30 in reinforced polymeric composite cylinder 12 are positioned with a similar spacing as complimentary holes in split ring band 20 and in plugs 16 and 18. Holes 30 may be threaded to accommodate fasteners 22, which may be threaded screws 22. The common embodiment of the present invention provides for non-threaded holes 30 which simply allow a screw 22 to traverse therethrough and to be threaded into end plug 16 or 18.

Piston assembly 14 is of a common form including a piston, not shown, that is attached to a shaft 32. Shaft 32 extends through end plug 18 and connects with yoke 34. Yoke 34 connects to a mechanical assembly for the movement thereof.

End plug 16 includes a yoke 36, a body 38 and blind holes 40. Yoke 36 may be coupled with a mechanical assembly to provide a lifting point for movement of shaft 32. End plugs 16 and 18 both include a body 38, with body 38 of end plug 16 interacting with yoke 36 and body 38 of end plug 18 having an opening therein to accommodate shaft 32. Blind holes 40 are located about an outer surface of end plugs 16 and 18 so as to align with holes in reinforced polymeric composite cylinder 12 and split ring band 20. Blind holes 40 may be threaded in order to accommodate complimentary threads on fasteners 22.

Split ring band 20 includes a body 42, chamfered holes 44 and a split 46. Body 42 is of a flexible resilient material that allows band 20 to be opened and slid over outer surface 26 of reinforced polymeric composite cylinder 12 and to be positioned in annular groove 28. Chamfered holes 44 accommodate screws 22 that are positioned through holes 44, holes 30 and into blind holes 40. Fasteners 22 are tightened to draw body 42 tightly into annular groove 28 and to tighten band 20 against reinforced polymeric composite cylinder 12 thereby putting pressure onto an outer surface of end plugs 16 and 18. While split band 20 has been illustrated and described as a single piece it is also contemplated the more than one piece can be utilized in a segmented manner to achieve the same effect. It is also anticipated to utilize a split band 20 having a cross-section other than that of a rectangle. For example, a trapezoid shape can be utilized and groove 28 would be complementarily shaped to accommodate the trapezoidal shape.

The steps in assembling hydraulic/pneumatic assembly 10 include inserting an end plug 16 or 18 into an appropriate end of reinforced polymeric composite cylinder 12 and aligning holes 40 with holes 30. Split ring band 20 is then inserted over outer surface 26 of reinforced polymeric composite cylinder 12 and positioned in annular groove 28. Split ring band 20 is rotated until holes 44 are aligned with holes 30 and 40. Screws 22 are inserted through holes 44 through holes 30 and are threaded into blind holes 40. Body 42 interacts with annular groove 28 to provide a compression force of reinforced polymeric composite cylinder 12 against end plugs 16 and 18. Additionally as pressure is applied inside of reinforced polymeric composite cylinder 12, interaction between a shoulder of annular groove 28 and body 42 prevent slipping of band 20 along a surface of reinforced polymeric composite cylinder 12. The inner compressive force of band 20 causes reinforced polymeric composite cylinder 12 to flex against and be secured to end plugs 16 and 18. Advantageously splint ring band 20 can be easily disassembled from reinforced polymeric composite cylinder 12 by removal of fasteners 22.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pressure assembly, comprising:
   a cylinder having an end, an inner surface and an outer surface;
   an end plug inserted into said end of said cylinder, said end plug having an outer surface that is in partial contact with said inner surface of said cylinder; and
   a ring band in contact with said outer surface of said cylinder, said ring band being secured to said cylinder and to said end plug and said ring band including a plurality of holes therethrough;
   said cylinder having a plurality of holes therethrough, said holes of said ring band being spaced similar to a spacing of said holes in said cylinder.

2. The assembly of claim 1, wherein said cylinder is a reinforced polymeric composite cylinder including a reduced diameter portion on said outer surface to accommodate said ring band.

3. The assembly of claim 2, wherein said ring band is at least partially disposed in said reduced diameter portion.

4. The assembly of claim 3, wherein said ring band substantially fills said reduced diameter portion.

5. The assembly of claim 1, wherein said cylinder includes an annular groove to accommodate positioning of said ring band therein.

6. The assembly of claim 5 wherein said cud plug includes a plurality of blind holes therein which substantially align with said plurality of holes in said cylinder.

7. The assembly of claim 6 further comprising a plurality of fasteners that utilize said holes in said band, said holes in said cylinder and said blind holes of said end plug to secure said band to said end plug.

8. The assembly of claim 1, further comprising:

an other end plug; and another ring band, wherein said cylinder has an other end into which said other end plug is inserted, said other ring band being in contact with said outer surface of said cylinder, said other ring band being secured to said cylinder and to said other end plug.

9. A fluid tight end of a cylinder assembly, comprising:

a tube having an inner shaped surface and an outer surface;

a plug having an outer surface shaped to compliment said inner shaped surface, said plug being placed in at least partial contact with said inner shaped surface; and a band positioned on said outer surface of said tube, said band being secured to said outer surface of said tube and to said plug, said band including a plurality of holes therethrough, said tube having a plurality of holes therethrough, said holes of said band being spaced similar to a spacing of said holes in said tube.

10. The assembly of claim 9, wherein said tube being a reinforced polymeric composite tube including a reduced diameter portion on said outer surface to accommodate said band.

11. The assembly of claim 10, wherein said band is at least partially disposed in said reduced diameter portion.

12. The assembly of claim 10, wherein said band substantially tills said reduced diameter portion.

13. The assembly of claim 9, wherein said tube includes an annular groove to accommodate positioning of said band therein.

14. The assembly of claim 13, wherein said plug includes a plurality of blind holes therein which substantially align with said plurality of holes in said tube.

15. The assembly of claim 14, thither comprising a plurality of fasteners that utilize said holes in said band, said holes in said tube and said blind holes of said plug to secure said band to said end plug.

16. The assembly of claim 9, further comprising:

another plug; and an other band, wherein said tube has an other end into which said other plug is inserted, said other band being in contact with said outer surface of said tube, said other split ring band being secured to said tube and to said other end plug.

17. A pressure assembly, comprising:

a cylinder having an end an inner surface, an outer surface and a plurality of apertures therethrough, an end plug inserted into said end of said cylinder, said end plug having an outer surface that is positioned to lie near said inner surface of said cylinder; and a band having a plurality of apertures and positioned to lie near said outer surface of said cylinder, said band being secured to said cylinder and to said end plug;

wherein said holes of said ring band being spaced similar to a spacing of said holes in said cylinder.

\* \* \* \* \*